United States Patent Office 3,267,146
Patented August 16, 1966

3,267,146
PROCESS FOR N-ALKYLATION OF AROMATIC AMINES
Louis Schmerling, Riverside, Ill., assignor to Universal Oil Products Company, Des Plaines, Ill., a corporation of Delaware
No Drawing. Filed Jan. 27, 1965, Ser. No. 428,541
12 Claims. (Cl. 260—577)

This application is a continuation-in-part of my copending application Serial No. 239,768 filed November 23, 1962, now abandoned.

This invention relates to a process for the alkylation of aromatic amines. More specifically, the invention is concerned with a process for the N-alkylation of mono- and polycyclic aromatic amines.

As shown in the prior art, the alkylation of aromatic amines using an aluminum metal catalyst results in the nuclear or C-alkylation of the aromatic amine. In addition, when the aluminum metal catalyst used for this process is promoted with mercury chloride (resulting in the formation of aluminum chloride) the reaction product is again nuclearly alkylated.

In contradistinction to the teachings of the prior art, it has now been unexpectedly discovered that by using aluminum metal as a catalyst and a *salt* of the aromatic amine as the starting material, N-alkylation of the aromatic amine salt occurs when it is treated with an olefinic alkylating agent.

While the N-alkylation of aromatic amines has been previously accomplished, the catalysts which are used to bring about this condensation are entirely different from that of this invention. Such catalysts include alkaline earth metal hydrides, iodine, and catalysts which are capable of splitting off water such as alumina, thorium oxide, cerium oxide, silica gel, etc.

The products prepared according to the process of this invention will find a wide variety of use in the chemical field particularly as intermediates in the preparation of dyes, pharmaceuticals, light-sensitive diazonium salts which are used for diazo-type printing papers and inhibitors which will retard the oxidative deterioration of various organic materials such as motor fuel, particularly unsaturated gasolines as, for example, cracked gasoline and polymer gasolines, diesel oil, mineral oil, lubricating oil, fuel oil, drying oil, greases, rubber monomers such as styrene, butadiene, etc., paraffin waxes, edible fats and oils, etc.

Among the edible fats and oils which may be of animal, vegetable or mineral origin and which tend to become rancid especially during long periods of storage prior to use are linseed oil, menhadin oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. These materials are adversely affected by oxygen with the resultant formation of undesirable gums, discoloration, rancidity or other deleterious reactions. Therefore, certain substances must be added to the aforementioned organic materials which act to stabilize such materials and thus delay or prevent the undesired reactions from occurring. These additives will fall within the broad term "inhibitors" which may be prepared from the intermediates formed according to the process of this invention.

It is therefore an object of this invention to provide a process for the preparation of N-alkylated aromatic amines.

Another object of this invention is to provide a process for preparing N-alkyl and N,N-dialkyl aromatic amines which are useful, as hereinbefore set forth, as intermediates in the preparation of other organic compounds.

In a broad aspect, one embodiment of this invention resides in a process for the production of an N-alkylaromatic amine which comprises alkylating an inorganic acid salt of an aromatic amine selected from the group consisting of mono- and polycyclic amines containing at least one replaceable hydrogen atom on the nitrogen atom with a compound selected from the group consisting of alkenes and cycloalkenes containing from 2 to about 18 carbon atoms per molecule at a temperature in the range of from about 100° to about 300° C. at a pressure in the range of from about atmospheric to about 200 atmospheres in the presence of a catalyst consisting essentially of aluminum metal, and recovering the resultant N-alkylaromatic amine.

A specific embodiment of this invention is found in a process which comprises condensing aniline hydrobromide with ethylene at a temperature in the range of from about 150° to about 250° C. and at a pressure of from about 50 atmospheres to about 150 atmospheres in the presence of a catalyst consisting essentially of aluminum metal, and recovering the resultant N-ethylaniline and N,N-diethylaniline.

Other objects and embodiments will be found in the following further detailed description of this invention.

As hereinbefore set forth, the present invention is concerned with a process for the preparation of alkyl aromatic amines in which the alkyl substituent is on the nitrogen atom, said process involving the condensation of an inorganic acid salt of an aromatic amine with an alkylating agent in the presence of a catalyst consisting essentially of aluminum metal. In the preferred embodiment of this invention the alkylating agent will comprise an olefinic hydrocarbon containing only carbon and hydrogen atoms, said olefinic hydrocarbon comprising alkenes and cycloalkenes containing only one double bond per molecule. In addition, it is also contemplated that polyolefins either straight chain or cyclic in configuration which contain more than one double bond per molecule may also be utilized. Mono-olefinic hydrocarbons which may be used as alkylating agents are either normally gaseous or normally liquid and will include ethylene, propylene, 1-butene, 2-butene, isobutylene, 1-pentene, 2-pentene, 3-pentene, isopentene, 1-hexene, 2-hexene, 3-hexene, isohexene; the isomeric heptenes, octenes, nonenes, decenes, undecenes, dodecenes, tridecenes, tetradecenes, pentadecenes, hexadecenes, heptadecenes, octadecenes, etc.; cyclic olefins such as cyclopentene, cyclohexene, cycloheptene, methylcyclopentene, methylcyclohexene; polycyclic olefins such as norbornene (bicyclo[2.2.1]2-heptene). In addition to the aforementioned mono-olefinic alkylating agents, it is contemplated within the scope of this invention that polyolefinic hydrocarbons which are utilized as alkylating agents in the process of this invention include conjugated diolefins such as butadiene and isoprene (2-methyl-1,3-butadiene) as well as non-conjugated olefins such as 1,4-pentadiene, and 1,5-hexadiene; and other poly-olefinic hydrocarbons containing more than two double bonds per molecule.

The alkylatable aromatic amine which is condensed with the aforementioned alkylating agents comprise an inorganic acid salt of an aromatic amine containing at least one replaceable hydrogen on the nitrogen atom. The hydrohalides are members of a preferred class of salt. Suitable salts of aromatic amines which may be used include Aniline hydrochloride,
Aniline hydrobromide,
Aniline hydroiodide,
Aniline hydrofluoride,
Aniline hydrosulfate,
Aniline hydrophosphate,
o-Toluidine hydrochloride, o-Toluidine hydrobromide,
o-Toluidine hydroiodide,
o-Toluidine hydrofluoride,
o-Toluidine hydrosulfate,
o-Toluidine hydrophosphate,
m-Toluidine hydrochloride,
m-Toluidine hydrobromide,
m-Toluidine hydroiodide,
m-Toluidine hydrofluoride,
m-Toluidine hydrosulfate,
m-Toluidine hydrophosphate,
p-Toluidine hydrochloride,
p-Toluidine hydrobromide,
p-Toluidine hydroiodide,
p-Toluidine hydrofluoride,
p-Toluidine hydrosulfate,
p-Toluidine hydrophosphate,
2,6-dimethylaniline hydrochloride,
2,6-dimethylaniline hydrobromide,
2,6-dimethylaniline hydroiodide,
2,6-dimethylaniline hydrofluoride,
2,6-dimethylaniline hydrosulfate,
2,6-dimethylaniline hydrophosphate,
2,4-dimethylaniline hydrochloride,
2,4-dimethylaniline hydrobromide,
2,4-dimethylaniline hydroiodide,
2,4-dimethylaniline hydrofluoride,
2,4-dimethylaniline hydrosulfate,
2,4-dimethylaniline hydrophosphate,
o-Ethylaniline hydrochloride,
o-Ethylaniline hydrobromide,
o-Ethylaniline hydroiodide,
o-Ethylaniline hydrofluoride,
o-Ethylaniline hydrosulfate,
o-Ethylaniline hydrophosphate,
m-Ethylaniline hydrochloride,
m-Ethylaniline hydrobromide,
m-Ethylaniline hydroiodide,
m-Ethylaniline hydrofluoride,
m-Ethylaniline hydrosulfate,
m-Ethylaniline hydrophosphate,
p-Ethylaniline hydrochloride,
p-Ethylaniline hydrobromide,
p-Ethylaniline hydroiodide,
p-Ethylaniline hydrofluoride,
p-Ethylaniline hydrosulfate,
p-Ethylaniline hydrophosphate,
1-naphthylamine hydrochloride,
1-naphthylamine hydrobromide,
1-naphthylamine hydrosulfate,
1-naphthylamine hydrophosphate,
2-naphthylamine hydrochloride,
2-naphthylamine hydrobromide,
2-naphthylamine hydroiodide,
2-naphthylamine hydrofluoride,
2-naphthylamine hydrosulfate,
2-naphthylamine hydrophosphate,
1-methyl-2-naphthylamine hydrochloride,
1-methyl-2-naphthylamine hydrobromide,
1-methyl-2-naphthylamine hydroiodide,
1-methyl-2-naphthylamine hydrofluoride,
1-methyl-2-naphthylamine hydrosulfate,
1-methyl-2-naphthylamine hydrophosphate,
1-ethyl-2-naphthylamine hydrochloride,
1-ethyl-2-naphthylamine hydrobromide,
1-ethyl-2-naphthylamine hydroiodide,
1-ethyl-2-naphthylamine hydrofluoride,
1-ethyl-2-naphthylamine hydrosulfate,
1-ethyl-2-naphthylamine hydrophosphate,
1,4-dimethyl-2-naphthylamine hydrochloride,
1,4-dimethyl-2-naphthylamine hydrobromide,
1,4-dimethyl-2-naphthylamine hydroiodide,
1,4-dimethyl-2-naphthylamine hydrofluoride,
1,4-dimethyl-2-naphthylamine hydrosulfate,
1,4-dimethyl-2-naphthylamine hydrophosphate,
o-Phenylenediamine hydrochloride,
o-Phenylenediamine hydrobromide,
o-Phenylenediamine hydroiodide,
o-Phenylenediamine hydrofluoride,
o-Phenylenediamine hydrosulfate,
o-Phenylenediamine hydrophosphate,
m-Phenylenediamine hydrochloride,
m-Phenylenediamine hydrobromide,
m-Phenylenediamine hydroiodide,
m-Phenylenediamine hydrofluoride,
m-Phenylenediamine hydrosulfate,
m-Phenylenediamine hydrophosphate,
p-Phenylenediamine hydrochloride,
p-Phenylenediamine hydrobromide,
p-Phenylenediamine hydrofluoride,
p-Phenylenediamine hydrosulfate,
p-Phenylenediamine hydrophosphate,
4-methyl-o-phenylenediamine hydrochloride,
4-methyl-o-phenylenediamine hydrobromide,
4-methyl-o-phenylenediamine hydroiodide,
4-methyl-o-phenylenediamine hydrofluoride,
4-methyl-o-phenylenediamine hydrosulfate,
4-methyl-o-phenylenediamine hydrophosphate,
4-methyl-m-phenylenediamine hydrochloride,
4-methyl-m-phenylenediamine hydrobromide,
4-methyl-m-phenylenediamine hydroiodide,
4-methyl-m-phenylenediamine hydrofluoride,
4-methyl-m-phenylenediamine hydrophosphate
4-ethyl-o-phenylenediamine hydrochloride,
4-ethyl-o-phenylenediamine hydrobromide,
4-ethyl-o-phenylenediamine hydroiodide,
4-ethyl-o-phenylenediamine hydrofluoride,
4-ethyl-o-phenylenediamine hydrosulfate,
4-ethyl-o-phenylenediamine hydrophosphate,
4-ethyl-m-phenylenediamine hydrochloride,
4-ethyl-m-phenylenediamine hydrobromide,
4-ethyl-m-phenylenediamine hydroiodide,
4-ethyl-m-phenylenediamine hydrofluoride,
4-ethyl-m-phenylenediamine hydrosulfate,
4-ethyl-m-phenylenediamine hydrophosphate,
2-methyl-m-phenylenediamine hydrochloride,
2-methyl-m-phenylenediamine hydrobromide,
2-methyl-m-phenylenediamine hydroiodide,
2-methyl-m-phenylenediamine hydrofluoride,
2-methyl-m-phenylenediamine hydrosulfate,
2-methyl-m-phenylenediamine hydrophosphate,
2-methyl-p-phenylenediamine hydrochloride,
2-methyl-p-phenylenediamine hydrobromide,
2-methyl-p-phenylenediamine hydroiodide,
2-methyl-p-phenylenediamine hydrofluoride,
2-methyl-p-phenylenediamine hydrosulfate,
2-methyl-p-phenylenediamine hydrophosphate,
1,2,3-triaminobenzene hydrochloride,
1,2,3-triaminobenzene hydrobromide,
1,2,3-triaminobenzene hydroiodide,
1,2,3-triaminobenzene hydrofluoride,
1,2,3-triaminobenzene hydrosulfate,
1,2,3-triaminobenzene hydrophosphate,
1,2,4-triaminobenzene hydrochloride,
1,2,4-triaminobenzene hydrobromide,
1,2,4-triaminobenzene hydroiodide,
1,2,4-triaminobenzene hydrofluoride,
1,2,4-triaminobenzene hydrosulfate,
1,2,4-triaminobenzene hydrophosphate,
1,3,5-triaminobenzene hydrochloride,
1,3,5-triaminobenzene hydrobromide,
1,3,5-triaminobenzene hydroiodide,
1,3,5-triaminobenzene hydrofluoride,
1,3,5-triaminobenzene hydrosulfate,
1,3,5-triaminobenzene hydrophosphate, etc.

It is to be understood that the aforementioned salts of the aromatic amine are only representatives of the class of compounds which may be used and that the process of this invention is not necessarily limited thereto.

It is obvious that the process of this invention does not involve intermediate formation of an aluminum salt as catalyst, since formation of aluminum chloride, for example, would result in nuclear alkylation (C-alkylation) rather than the N-alkylation of the present process.

When the desired product comprises N,N-dialkyl aromatic amines, the alkylating agent is usually used in an excess over the amine, said excess being in a range of from about 2 to about 10 moles of olefinic hydrocarbon per mole of the inorganic acid salt of the aromatic amine.

The condensation between the inorganic acid salt of the aromatic amine and the alkylating agent comprising a mono- or polyolefinic hydrocarbon, either straight-chained or cyclic in configuration and containing from 2 to 18 carbon atoms is effected in the presence of a catalyst comprising a form of aluminum metal, the preferred form for such catalyst comprising aluminum powder, for the condensation being effected at alkylation conditions. Such alkylation conditions comprise a temperature within the range of from about 100° to about 250° C. and at a pressure in the range of from atmospheric to about 200 atmospheres, the preferred pressure range, particularly with normally gaseous olefins, being from about 50 to about 150 atmospheres. The optimum condensation conditions or alkylation conditions are dependent upon the reactants which are to be condensed. In the case of the pressure which is used said pressure will be sufficient to maintain at least a portion of the reactants in the liquid phase.

The process of this invention may be effected in any suitable manner and may comprise either a batch or continuous type operation. For example, when a batch type operation is used, a quantity of the inorganic acid salt of the aromatic amine and the aluminum powder catalyst is placed in an appropriate apparatus provided with heating means. A particularly applicable apparatus in which to effect a batch type operation comprises a rotating or a stirring autoclave. The alkylating agent such as a mono- or poly-olefinic hydrocarbon is added to the apparatus which is sealed and heated to the desired reaction temperature. When the olefinic hydrocarbon is in gaseous form, sufficient olefin is pressed in to attain the desired reaction pressure. However, if the olefinic hydrocarbon is in liquid form, the desired pressure is attained by the use of an inert gas such as nitrogen. Upon completion of the desired residence time the autoclave and contents thereof are cooled to room temperature, the excess pressure is vented and the autoclave is opened. The reaction product is then dissolved in water made basic by the addition of an alkaline substance and the liberated amine is extracted with ether. Following this the ether extract is subjected to fractional distillation and the desired products comprising the N-alkyl aromatic amines are separated and recovered.

It is also contemplated within the scope of this invention that the process described herein may be effected in a continuous manner of operation. When such a method is used, the starting products comprising the inorganic acid salt of an aromatic amine and the alkylating agent are continuously charged to a reaction vessel containing the aluminum powder catalyst, said reaction zone being maintained at the proper operating conditions of temperature and pressure. Upon completion of the desired residence time the reactor effluent is continuously withdrawn, the N-alkyl aromatic amine is separated from unreacted starting materials and recovered by means similar to those hereinbefore set forth. A particularly desirable type of continuous method for this reaction comprises a fixed bed process in which the catalyst comprising aluminum granules is disposed as a fixed bed in a reaction zone while the starting materials are passed through said bed in either an upward or downward flow. Other continuous types of operations which may be used are the moving bed type in which the catalyst and reactants pass either concurrently or countercurrently to each other in a moving stream and the slurry type of operation in which the catalyst is carried into the reaction zone as a slurry in one of the starting materials.

Examples of alkylaromatic amines which may be prepared according to the process of this invention include N-ethylaniline,
N,N-diethylaniline,
N-isopropylaniline,
N,N-diisopropylaniline,
N-isobutylaniline,
N,N-diisobutylaniline,
N-t-butylaniline,
N-ethyl-o-toluidine,
N,N-diethyl-o-toluidine,
N-propyl-o-toluidine,
N,N-dipropyl-o-toluidine,
N-ethyl-m-toluidine,
N-sec-butyl-o-toluidine,
N,N-di-sec-butyl-o-toluidine,
N,N-diethyl-m-toluidine,
N-isopropyl-m-toluidine,
N,N-diisopropyl-m-toluidine,
N-sec-butyl-m-toluidine,
N,N-di-sec-butyl-m-toluidine,
N-ethyl-p-toluidine,
N,N-diethyl-p-toluidine,
N-isopropyl-p-toluidine,
N,N-diisopropyl-p-toluidine,
N-sec-butyl-p-toluidine,
N,N-di-sec-butyl-p-toluidine,
N-ethyl-o-ethylaniline,
N,N-diethyl-o-ethylaniline,
N-isopropyl-o-ethylaniline,
N,N-diisopropyl-o-ethylaniline,
N-sec-butyl-o-ethylaniline,
N,N-di-sec-butyl-o-ethylaniline,
N-ethylnaphthylamine,
N,N-diethylnaphthylamine,
N-isopropylnaphthylamine,
N,N-diisopropylnaphthylamine,
N-sec-butylnaphthylamine,
N,N-di-sec-butylnaphthylamine,
N-t-butylnaphthylamine, etc. It is to be understood that the aforementioned reaction products are only representatives of the type of compounds and that the present process is not necessarily limited thereto.

The following examples are given to illustrate the process of the present invention which, however, are not intended to limit the generally broad scope of the present invention in strict accordance therewith.

*Example I*

In this example 83 grams (0.48 mole) of aniline hydrobromide and 1 gram (0.04 mole) of aluminum powder were placed in an autoclave and ethylene pressed in until an initial pressure of 50 atmospheres was reached. The autoclave was sealed and heated at a temperature in the range of from about 100° to about 250° C. during a period of 5.5 hours. During this time the pressure reached a maximum of 125 atmospheres. At the end of the residence time the autoclave and contents thereof were cooled to room temperature, the excess pressure was vented and the autoclave opened. The reaction product was recovered, dissolved in water and made alkaline by the addition of a 10% aqueous solution of sodium hydroxide. The amine which was liberated by the addition of the sodium hydroxide was extracted with ether following which the ether extract was separated from the water layer. The ether extract was washed and dried and subjected to fractional distillation under reduced pressure yielding 27 grams of N-ethylaniline and 5 grams of N,N-diethylaniline.

Example II

In this example a mixture of 67 grams (0.5 mole) of aniline hydrochloride and 1 gram (0.4 mole) of aluminum powder is placed in an autoclave and ethylene pressed in until an initial pressure of 50 atmospheres is reached. The autoclave and contents thereof is then heated to a temperature of about 100° C. and maintained in a range of from about 100° to about 250° C. for a period of about 8 hours. At the end of this time the autoclave and contents thereof are cooled to room temperature, the excess pressure is vented and the autoclave opened. The reaction product is dissolved in water and made alkaline by the addition of a sodium hydroxide solution. Following this the liberated amine is extracted with ether, the ether extract is washed, dried and subjected to fractional distillation. The desired product comprising N-ethylaniline and N,N-diethylaniline is separated and recovered by said fractional distillation.

Example III

A rotating autoclave containing 113 grams of aniline hydroiodide and 1 gram of aluminum powder is heated to a temperature of 100° C. Sufficient propylene is pressed in until an initial pressure of 50 atmospheres is reached. Following this the autoclave is sealed and maintained at a temperature in the range of from about 100° to about 200° C. for a period of about 4 hours. At the end of this time the autoclave and contents thereof are cooled to room temperature, the excess pressure is vented and the reaction product treated in a manner similar to that set forth in the above examples. The desired product comprising N-isopropylaniline and N,N-diisopropylaniline is separated and recovered.

Example IV

In this example a salt of an aromatic amine comprising p-toluidine hydrosulfate is placed in an autoclave along with the catalyst comprising aluminum powder. Ethylene is pressed in until the desired initial pressure is reached following which the autoclave is sealed and heated to a temperature of from about 150° to about 250° C. Upon completion of the desired residence time the autoclave and contents thereof are allowed to cool to room temperature, the excess pressure is vented and the reaction product recovered. The product is dried by the addition of water to dissolve said product and is made alkaline by the addition of potassium hydroxide solution. The liberated amine is extracted with ether, the ether extract is separated from the water layer, washed and dried. The desired reaction product comprising N-ethyl-p-toluidine and N,N-diethyl-p-toluidine is recovered by means of fractional distillation under reduced pressure.

Example V

In this example p-toluidine hydrobromide is treated with propylene in the presence of aluminum powder in a manner similar to that set forth in the above examples. The desired product comprising N-isopropyl-p-toluidine and N,N-diisopropyl-p-toluidine is separated and recovered in a manner similar to that hereinbefore set forth.

I claim as my invention:

1. A process for the production of an N-alkyl-aromatic amine which comprises alkylating an inorganic acid salt of an aromatic amine selected from the group consisting of hydrohalide, hydrosulfate and hydrophosphate of aromatic amine having from 1 to 2 carbocyclic rings per molecule and containing at least one replaceable hydrogen atom on the nitrogen atom with a compound selected from the group consisting of alkenes and cycloalkenes containing from 2 to about 18 carbon atoms per molecule at a temperature in the range of from about 100° to about 300° C. at a pressure in the range of from about atmospheric to about 200 atmospheres in the presence of aluminum metal as catalyst, and recovering the resultant N-alkyl-aromatic amine.

2. The process of claim 1 further characterized in that said inorganic acid salt is the hydrochloride salt of said aromatic amine.

3. The process of claim 1 further characterized in that said inorganic acid salt is the hydrobromide salt of said aromatic amine.

4. The process of claim 1 further characterized in that said inorganic acid salt is the hydroiodide salt of said aromatic amine.

5. The process of claim 1 further characterized in that said inorganic acid salt is the hydrosulfate salt of said aromatic amine.

6. The process of claim 1 further characterized in that said alkene is ethylene.

7. The process of claim 1 further characterized in that said alkene is propylene.

8. A process which comprises condensing aniline hydrochloride with ethylene at a temperature in the range of from about 150° to about 250° C. and at a pressure of from about 50 atmospheres to about 150 atmospheres in the presence of aluminum metal as catalyst, and recovering the resultant N-ethylaniline and N,N-diethylaniline.

9. A process which comprises condensing aniline hydrobromide with ethylene at a temperature in the range of from about 150° to about 250° C. and at a pressure of from about 50 atmospheres to about 150 atmospheres in the presence of aluminum metal as catalyst, and recovering the resultant N-ethylaniline and N,N-diethylaniline.

10. A process which comprises condensing aniline hydroiodide with propylene at a temperature in the range of from 150° to about 250° C. and at a pressure in the range of from about 50 atmospheres to about 150 atmospheres in the presence of aluminum metal as catalyst, and recovering the resultant N-isopropylaniline and N,N-diisopropylaniline.

11. A process which comprises condensing p-toluidine hydrosulfate with ethylene at a temperature in the range of from about 150° to about 250° C. and at a pressure of from about 50 atmospheres to about 150 atmospheres in the presence of aluminum metal as catalyst, and recovering the resultant N-ethyl-p-toluidine and N,N-diethyl-p-toluidine.

12. A process which comprises condensing p-toluidine hydrobromide with propylene at a temperature in the range of from about 150° to about 250° C. and at a pressure in the range of from about 50 atmospheres to about 150 atmospheres in the presence of aluminum metal as catalyst, and recovering the resultant N-isopropyl-p-toluidine and N,N-diisopropyl-p-toluidine.

References Cited by the Examiner

UNITED STATES PATENTS

| | | | |
|---|---|---|---|
| 2,115,884 | 5/1938 | Schollkopf | 260—577 X |
| 2,762,845 | 9/1956 | Stroh et al. | 260—578 |

OTHER REFERENCES

Gould, Inorganic Reactions and Structure, 1958, p. 131.

CHARLES B. PARKER, *Primary Examiner.*

DALE R. MAHANAND, *Assistant Examiner.*